United States Patent
Ning

(10) Patent No.: US 11,329,501 B2
(45) Date of Patent: May 10, 2022

(54) POWER SUPPLY APPARATUS WAKE-UP CIRCUIT

(71) Applicant: MERRY ELECTRONICS (SHENZHEN) CO., LTD., GuangDong (CN)

(72) Inventor: Guang Ning, ShenZhen (CN)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 142 days.

(21) Appl. No.: 16/801,007

(22) Filed: Feb. 25, 2020

(65) Prior Publication Data
US 2021/0083504 A1 Mar. 18, 2021

(30) Foreign Application Priority Data
Sep. 17, 2019 (CN) .......................... 201910875645.2

(51) Int. Cl.
*H02J 9/00* (2006.01)
*H02J 7/00* (2006.01)

(52) U.S. Cl.
CPC .......... *H02J 9/005* (2013.01); *H02J 7/00306* (2020.01)

(58) Field of Classification Search
None
See application file for complete search history.

(56) References Cited

U.S. PATENT DOCUMENTS

| | | | |
|---|---|---|---|
| 2009/0010462 A1* | 1/2009 | Ekchian | H01M 10/0436 381/312 |
| 2011/0140665 A1* | 6/2011 | Tamezane | H02J 7/0016 320/118 |
| 2011/0210709 A1* | 9/2011 | Mounier | H02J 1/14 323/271 |
| 2020/0114847 A1* | 4/2020 | Harvey | B60L 58/10 |

* cited by examiner

*Primary Examiner* — Jared Fureman
*Assistant Examiner* — Aqeel H Bukhari
(74) *Attorney, Agent, or Firm* — Hamre, Schumann, Mueller & Larson, P.C.

(57) ABSTRACT

A power supply apparatus wake-up circuit is provided. The power supply apparatus wake-up circuit includes a power consumption control circuit and a wake-up circuit connected to the power consumption control circuit. The power consumption control circuit includes a voltage regulation module and a protection circuit connected to the voltage regulation module. The voltage regulation module adjusts a voltage output to the protection circuit according to a sleep control signal. The protection circuit determines whether to trigger over-discharge protection according to an input voltage. The wake-up circuit includes a first switching device, and the wake-up circuit outputs a wake-up control signal to the protection circuit based on an operation of the first switching device by a user such that the protection circuit stops triggering the over-discharge protection.

11 Claims, 3 Drawing Sheets

POWER SUPPLY APPARATUS WAKE-UP CIRCUIT

CROSS-REFERENCE TO RELATED APPLICATION

This application claims the benefit of Chinese Patent Application No. 2019108756452, filed on Sep. 17, 2019, the entire content of which is incorporated herein in its entirety.

TECHNICAL FIELD

The present disclosure relates to the field of power supply technology, in particular to a power supply apparatus wake-up circuit.

BACKGROUND

Currently, the standby current that can be achieved by the common power supply technology in the industry is usually about 200 microamperes, and the low-end power supply product is even more than 2 milliamperes. It is necessary to control the power amount of the power supply products to no more than 30%, and to recharge it after the product is transported to the destination before the product is sold from the viewpoint of safety in the long-term transportation process. Due to the need to control the power amount of the power supply products to no more than 30% during transportation process, standby current requirement for power supply products is more stringent.

Current energy storage apparatus, such as power supply products, only reduce the standby current at the back end, which will lead to incomplete reduction. How to make the standby current of power supply products to be more complete is an important topic in the present disclosure. At the same time, how to wake up the power supply products entering the low power consumption state becomes another important topic in the present disclosure.

SUMMARY

A power supply apparatus wake-up circuit is provided to address at least one issue above mentioned.

The power supply apparatus wake-up circuit includes a power consumption control circuit and a wake-up circuit. The power consumption control circuit may be connected to the wake-up circuit. The power consumption control circuit may include a voltage regulation module and a protection circuit. The voltage regulation module is electrically connected to the protection circuit. The voltage regulation module adjusts a voltage output to the protection circuit according to a sleep control signal. The protection circuit determines whether to trigger over-discharge protection according to an input voltage. The wake-up circuit may include a first switching device, and the wake-up circuit outputs a wake-up control signal to the protection circuit based on an operation of the first switching device by a user such that the protection circuit can stop the triggering of the over-discharge protection.

In the power supply apparatus wake-up circuit, on the one hand, the voltage regulation module (equivalent to intervention from a front end) is provided in the power consumption control circuit, and the voltage regulation module is used to regulate the voltage input to the protection circuit after receiving the sleep control signal. The protection circuit determines whether to trigger the over-discharge protection according to the received voltage. Since the whole circuit is in the power-off protection state after triggering the over-discharge protection, standby current of the system can be reduced more thoroughly in the power-off protection state such that the standby current of the present disclosure can be reduced to less than 1 microampere. On the other hand, the wake-up function of the circuit can be realized by providing the first switching device in the wake-up circuit to accept the operation of the user and stop triggering the over-discharge protection according to the control operation by the user.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to facilitate understanding of the disclosure, the disclosure will be described more fully below with reference to the accompanying drawings. Preferred embodiments of the present disclosure are shown in the accompanying drawings. However, the present disclosure can be implemented in many different forms and is not limited to the embodiments described herein. On the contrary, it is an object of these embodiments to provide a more thorough understanding of the disclosure of the present disclosure.

It should be noted that when an element is referred to as being "fixed" to another element, it can be directly on the other element or it can also be presence of a central element. When an element is considered to be "connected" to another element, the element can be directly connected to the other element or it can be simultaneous presence of the central element. The terms "vertical", "horizontal", "left", "right" and the like used herein are for illustrative purposes only and are not meant to be the only embodiment.

Figure 1:
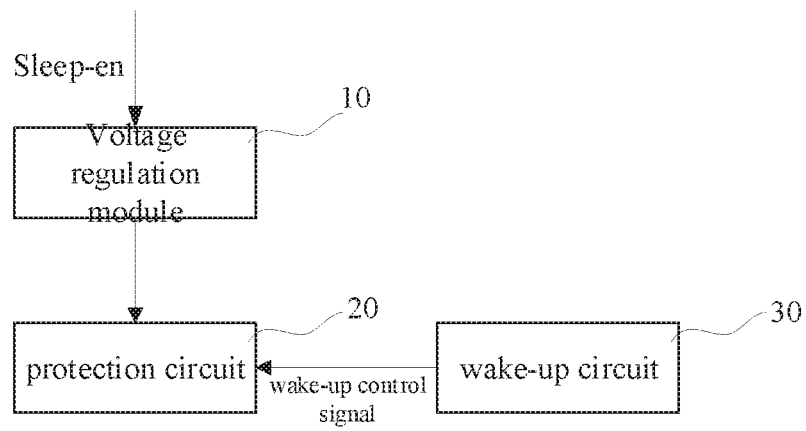
FIG. 1 is a block diagram of a power supply apparatus wake-up circuit according to an embodiment.
Figure 4:
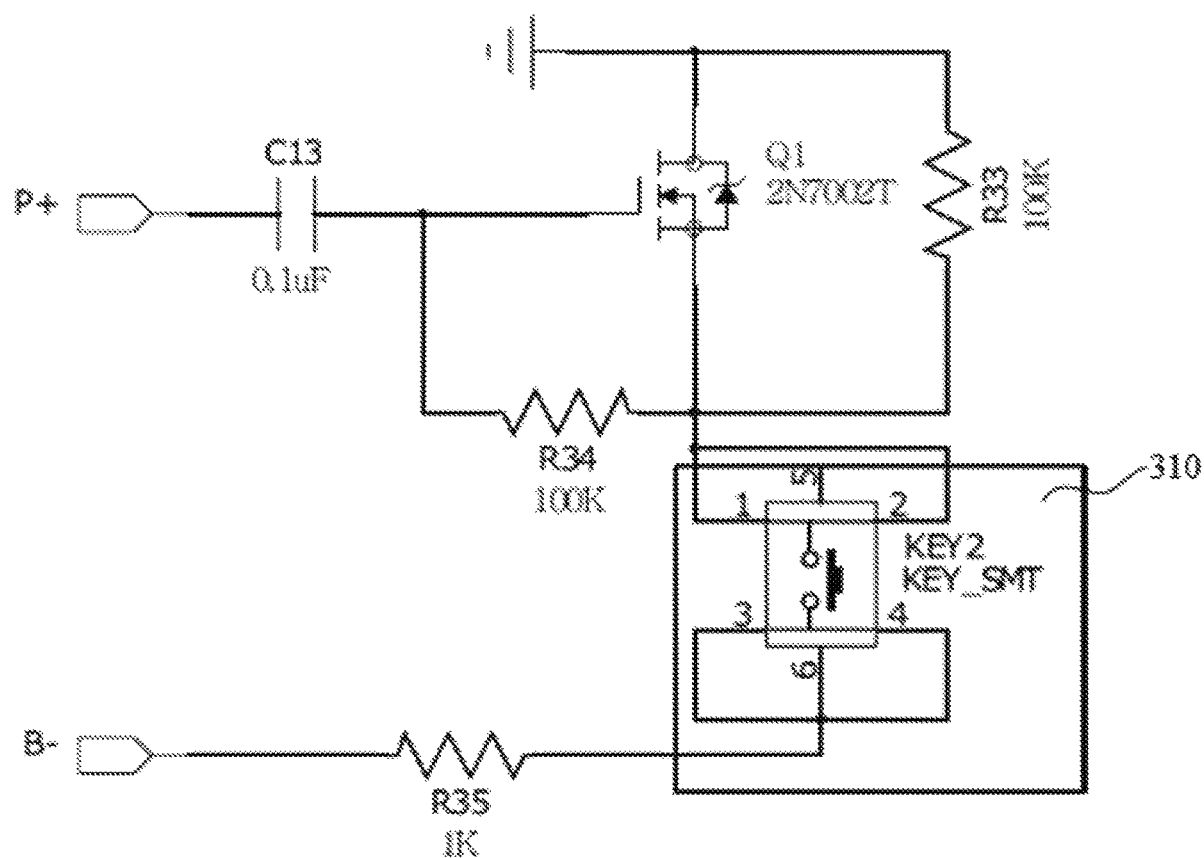
FIG. 4 is a part of a circuit structure diagram of a wake-up circuit according to another embodiment.

Referring to FIG. 1 and FIG. 4 at the same time, a power supply apparatus wake-up circuit may include a power consumption control circuit and a wake-up circuit 30. The power consumption control circuit is connected to the wake-up circuit 30. The power consumption control circuit includes a voltage regulation module 10 and a protection circuit 20. The voltage regulation module 10 is electrically connected to a protection circuit 20. The voltage regulation module 10 adjusts a voltage output to the protection circuit 20 according to a sleep control signal SLEEP-EN, and the protection circuit 20 determines whether to trigger over-discharge protection according to an input voltage. The wake-up circuit 30 includes a first switching device 310. The wake-up circuit 30 outputs a wake-up control signal to the protection circuit 20 based on an operation of the first switching device 310 by a user, such that the protection circuit 20 stops triggering the over-discharge protection. Further, the first switching device 310 of the present disclosure may include any one of a key switch, a travel switch, a contact switch, and a magnetic control switch. Taking the first switching device 310 being a key switch as an example, when the user presses the key switch, the wake-up circuit 30 outputs a wake-up control signal to the protection circuit 20. The protection circuit 20 stops triggering the over-discharge protection after receiving the wake-up control signal. That is to say; the protection circuit 20 is generally in a state of over-discharge protection before receiving the wake-up control signal, and stops the triggering of the over-discharge protection with receiving the wake-up control signal. In order to facilitate description and explanation, the following embodiments of the present disclosure are all explained by taking the application of the power supply apparatus wake-up circuit to the mobile pow supply as an example.

The sleep control signal SLEEP-EN mainly causes entire power supply system of the mobile power supply to enter a lithium battery protection standby sleep state. A standby current of the general mobile power supply is usually 200 microamperes and some slightly lower end products may even exceed 2 milliamps before entering the lithium battery protection standby sleep state. On the one hand, it is desirable to minimize the standby current of the mobile power supply at a minimum cost, and on the other hand, it is desirable to wake up power supply products which have already entered into a low power consumption state. Conventional mobile power supply directly controls the entire power supply system to enter into the lithium battery protection standby sleep state after receiving the sleep control signal SLEEP-EN. However, the present disclosure provides a voltage regulation module 10 which can adjust the output voltage to control the voltage output to the protection circuit 20. The protection circuit 20 of the present disclosure uses a lithium battery protection board, in which the basic circuits such as an overvoltage protection circuit, an undervoltage protection circuit, an open circuit protection circuit, and a short circuit protection circuit are integrated. The lithium battery protection board detects the voltage which is adjusted by the voltage regulation module 10 and compares the detected voltage with an internally set voltage. If the voltage adjusted by the voltage regulation module 10 is smaller than internally set voltage, the over-discharge protection is triggered, which protects the battery from discharging too much electricity. In the general lithium battery mobile power supply, due to the characteristics of the lithium battery itself, it cannot be over-charged, over-discharged, over-current, short-circuit and ultra-high temperature charging and discharging. Therefore, in order to avoid above-mentioned situation(s) occurs in the lithium battery, some protection devices similar to the lithium battery protection board and some current safety devices are arranged in the lithium battery mobile power supply, to protect the mobile power supply. After the over-discharge protection is triggered, the whole power supply system will be cut off, and the standby current of the whole mobile power supply will be reduced to not more than 1 microampere. It is understood that the specific value to which the standby current can be reduced mainly depends on the specification of the selected protection circuit.

It is understood that the power supply apparatus wake-up circuit of the present disclosure may be applied to any case using the lithium battery protection board. The power supply apparatus of the present disclosure includes, but is not limited to, a portable wired mobile power supply, a wireless mobile power supply, an earphone charging chamber, and the like. Further, the present disclosure is not limited to discrete devices or integrally packaged in one or more chips, for example, the design concept of the present disclosure may be added to a two-in-one scheme of the lithium battery protection board and a field effect transistor, alternatively, the design concept of the present disclosure may be added to a multi-in-one scheme of the mobile power supply to achieve the effect of the present disclosure.

Figure 2:
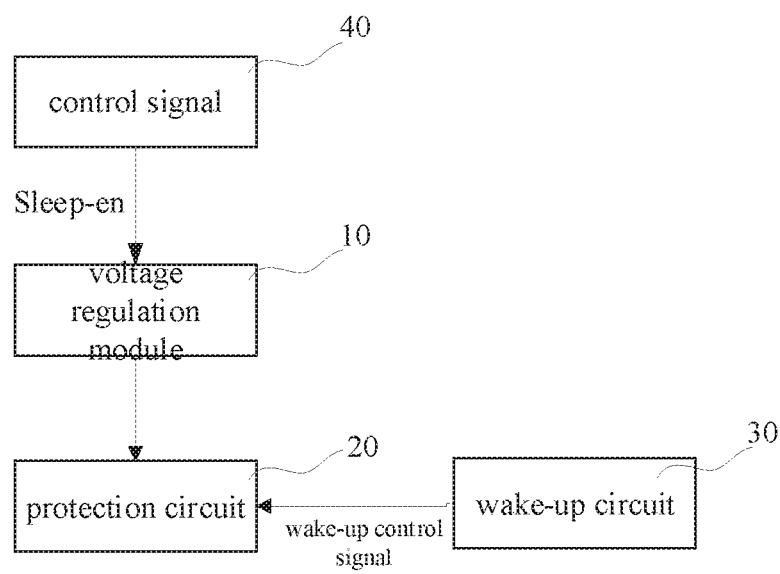
FIG. 2 is a block diagram of the power supply apparatus wake-up circuit according to another embodiment.

In one embodiment, referring to FIG. 2, the power supply apparatus wake-up circuit may further include a control circuit 40 for outputting the sleep control signal SLEEP-EN. The sleep control signal SLEEP-EN can be output by the control circuit 40 after receiving an external trigger command, and the control circuit 40 can be a micro-controller. Specifically, the HC18P124 single-chip microcomputer may be selected as the micro-controller.

In one embodiment, the voltage regulation module 10 may be a voltage dividing resistor (not shown) with a resistance of 100 ohms. One end of the voltage dividing resistor is connected to a signal output terminal of the control circuit 40 to receive the sleep control signal SLEEP-EN output by the control circuit 40. The other end of the voltage dividing resistor is connected to a power supply input terminal of the protection circuit 20. The sleep control signal SLEEP EN output by the control circuit 40 is pulled down (divided) by the voltage dividing resistor and the pulled down signal SLEEP-EN is input to the power supply input terminal of the protection circuit 20. The protection circuit 20 compares the input sleep control signal SLEEP-EN with an internally set voltage threshold and determines whether to trigger the over-discharge protection based on the comparison result. The purpose of ultra-low power consumption can be achieved by using only one voltage dividing resistor, such that the cost of the present disclosure is minimized. Illustratively, the present disclosure is explained with voltage output by the control circuit 40 being 4.35V, voltage dividing ratio of the voltage dividing resistor being 1/2, and undervoltage protection voltage of the protection circuit 20 being 2.5V. The voltage input to the protection circuit 20 is divided by the voltage dividing resistor, and the voltage dividing ratio is 1/2. The divided voltage is up to 2.175 V, which is lower than undervoltage protection voltage (2.5 V) of the protection circuit 20. The protection circuit 20 triggers the over-discharge protection of the battery.

In one embodiment, the voltage regulation module 10 can also be a PWM voltage regulation circuit (not shown) whose input terminal is connected to a signal output terminal of the control circuit 40 to receive the sleep control signal SLEEP-EN output by the control circuit 40. An output terminal of the PWM voltage regulation circuit is connected to the power supply input terminal of the protection circuit 20. The PWM voltage regulation circuit adjusts a duty ratio of the output PWM signal according to the sleep control signal SLEEP-EN. The protection circuit 20 determines whether to trigger the over-discharge protection according to the adjusted PWM signal. The judgment principle is similar to the voltage dividing resistor, which will not be described further herein.

In one embodiment, the voltage regulation module 10 may also be a digital-to-analog control circuit (not shown) whose input terminal is connected to the signal output terminal of the control circuit 40 to receive the sleep control signal SLEEP-EN output by the control circuit 40. An output terminal of the digital-to-analog control circuit is connected to the power supply input terminal of the protection circuit 20. The digital-analog control circuit is used for outputting a preset voltage to the protection circuit 20 according to the sleep control signal. SLEEP-EN to cause the protection circuit 20 to trigger the over-discharge protection. The preset voltage is usually a fixed value which is lower than the minimum value at which the protection circuit 20 can trigger the over-discharge protection. It can be understood that the principle of the protection circuit 20 determining whether to trigger the over-discharge protection according to the voltage output by the digital-analog control circuit is similar to the voltage dividing resistor, which will not be described further herein.

Figure 3:
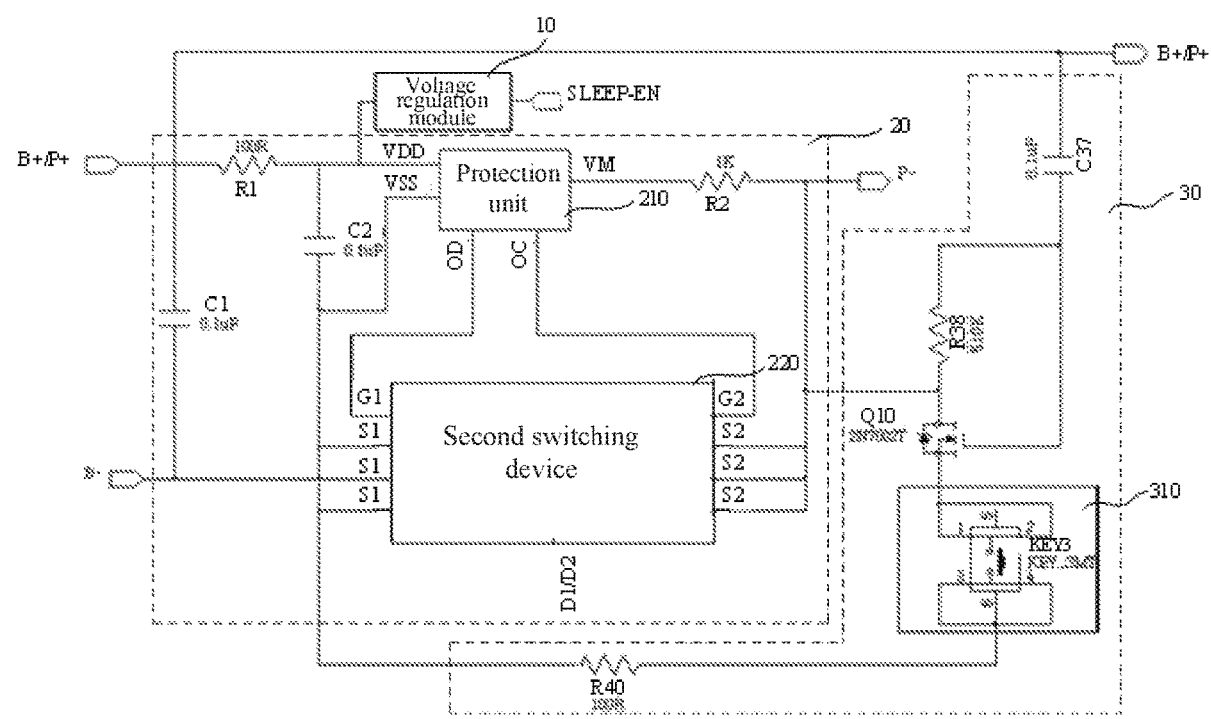
FIG. 3 is a schematic diagram of the power supply apparatus wake-up circuit according to an embodiment.

FIG. 3 is a schematic diagram of the power supply apparatus wake-up circuit according to an embodiment. In FIG. 3, the protection circuit 20 may include a protection unit 210 and a second switching device 220. The second switching device 220 may be a field effect transistor, and may specifically be an N-channel field effect transistor. A positive power supply input terminal VDD of the protection unit 210 is connected to an output terminal of the voltage regulation module 10, and input terminals G1 and G2 (gates) of the second switching device 220 are connected to output terminals OD and OC of the protection unit 210. In response to that a voltage output by the voltage regulation module 10 is lower than a voltage threshold, the protection unit 210 control the second switching device 220 to cut off system power supply of the power supply apparatus wake-up circuit. Since the present disclosure takes the application of the power supply apparatus wake-up circuit to the mobile power supply as an example, controlling the second switching device 220 to cut off the system power supply of the power supply apparatus wake-up circuit is to cut off the system power supply of the mobile power supply. In the specific operation, a protection circuit may also be provided to form a parallel circuit with a circuit in which the protection unit 210 is located, and one circuit may be selected according to specific situation. Further, the protection unit 210 may adopt a type S-8211 lithium battery protection chip, and a VM terminal of such type lithium battery protection chip is a charger (not shown) access detection port. That is, the lithium battery protection chip detects voltage difference between the lithium battery voltage (VDD terminal voltage) and the charger voltage (VM terminal voltage) in the charger electrically connecting into the VM terminal of the lithium battery protection chip, and sleep state is released only when the voltage difference is greater than 1.3V, i.e., the power supply apparatus that enters into the low power consumption state will be waked up.

Further, the interfaces provided with the power supply apparatus wake-up circuit of the present disclosure can include at least one of USB, TYPE-C and Pogo PIN interfaces. Since the present disclosure takes the application of the power supply apparatus wake-up circuit to the mobile power supply as the example, the power supply apparatus wake-up circuit shares interface(s) with the mobile power supply. In other words, the power supply apparatus wake-up circuit of the present disclosure may have only one of the interfaces, such as, only the USB interface, or only the TYPE-C interface, or only the Pogo PIN interface. The Pogo PIN interface is a charging interface of a Bluetooth headset. The power supply apparatus wake-up circuit can also have two interfaces at the same time, such as, both the USB interface and the TYPE-C interface, or both the USB interface and the Pogo PIN interface, or both the TYPE-C interface and the Pogo PIN interface. The power supply apparatus wake-up circuit may also have three interfaces simultaneously, for example, the USB interface, the TYPE-C interface, and the Pogo PIN interface.

However, the wake-up function of the conventional type S-8211 lithium battery protection chip usually works only when the charger is electrically connected, that is, when detecting that the charger is electrically connected to the power supply apparatus and that the voltage difference between the lithium battery voltage (VDD terminal voltage) and the charger voltage (VM terminal voltage) is greater than 1.3V (typical value), the power supply apparatus in the low power consumption state will be waked up. This scheme has some limitations and cannot bring the user very good use experience.

Based on this, it is also desirable to provide a technical solution capable of solving above technical problems, which will be described in detail by the following embodiments.

Referring to FIG. 3 again, the power supply apparatus wake-up circuit of the present disclosure can be specifically applied to different power supply products, when the power supply apparatus wake-up circuit of the present disclosure is applied to a specific battery PACK (assembled battery), P+ denotes a positive terminal of the battery PACK, and P− denotes a negative terminal (ground terminal) of the battery PACK. As shown in FIG. 3, the wake-up circuit 30 of the present disclosure can include a field effect transistor Q10, a resistor R38, a resistor R40, and a capacitor C37. One end of the resistor R40 is connected to a negative electrode B− of the battery, and the other end of the resistor R40 is connected to the first switching device 310. The other end of the first switching device 310 is connected to a source of the field effect transistor Q10. A gate of the field effect transistor Q10 is connected to the capacitor C37. A drain of the field effect transistor Q10 is grounded (negative terminal P− of the battery PACK). The other end of the capacitor C37 is connected to the positive terminal P of the battery pack or a positive electrode B+ of the battery. The resistor R38 is connected between the gate and the drain of the field effect transistor Q10. The common terminal of the resistor R38 and the drain of the field effect transistor Q10 is connected between the ground terminal (negative terminal P− of the battery pack) and a source S2 of the second switching device.

In summary, with reference to FIG. 3, the present disclosure use the voltage regulation module 10 as the voltage dividing resistor, the protection unit 210 as the lithium battery protection board, the second switching device 220 as the field effect transistor, the first switching device 310 as the key switch for illustrating the operation principle of the power supply apparatus wake-up circuit of the present disclosure entering into the low power consumption state and releasing the low power consumption state:

First, in the low power consumption state, the voltage regulation module (voltage dividing resistor) 10 receives the sleep control signal SLEEP-EN output by the control circuit 40, and pulls down the sleep control signal SLEEP-EN (voltage dividing), then the pulled down signal is input to a VDD terminal of the protection unit 210. The protection unit 210 compares voltage difference between the VDD terminal and a VSS terminal with internally set voltage threshold value, and determines whether to trigger the over-discharge protection according to the comparison result. If the voltage difference between the VDD terminal and the VSS terminal is less than the voltage threshold set inside the protection unit 210, the protection unit 210 outputs a switching signal to the second switching device 220. After receiving the switching signal, the second switching device 220 cuts off the system power supply of the power supply apparatus wake-up circuit, such that the whole system enters into the low power consumption state in which the standby power consumption of the system in the low power consumption state is lower than 1 microampere.

Second, in the low power consumption release state, the protection unit 210 of the present disclosure selects the type S-8211C series lithium battery protection board. Conditions for releasing the whole system from the sleep state based on the lithium battery protection board are that 1. the voltage difference between the VDD terminal and the VSS terminal is greater than undervoltage release voltage; 2. the voltage difference between the VDD terminal and the VM terminal is greater than 1.3V (typical value). Therefore, the working principle of releasing the low power consumption state is as follows:

1: When the first switching device 310 is turned off, the positive terminal P+ of the battery pack or the positive electrode B+ of the battery, the capacitor C37, the resistor R38, and the ground terminal P− form a charging circuit for the capacitor C37, then, the capacitor C37 is charged via the resistor R38.

2: When the first switching device 310 is turned on by pressing operation of the user, there are two cases in the present disclosure due to connection relationship of the circuits:

a: When the voltage of the negative terminal (ground terminal) P− of the battery PACK and the voltage of the negative electrode B− of the battery are the same, that is, the protection unit 210 in the power consumption control circuit is in an activation state, and gate-source voltage of the field effect transistor Q10 is 0 V, the field effect transistor Q10 is turned off. The on-resistance between the negative terminal (ground terminal) P− of the battery pack and the negative electrode B− of the battery approaches infinity, which does not affect the normal protection operation of the protection unit 210.

b: When the voltage of the negative terminal (ground terminal) P− of the battery pack is different from the voltage of the negative electrode B− of the battery, that is, the protection unit 210 in the power consumption control circuit is in a protection (sleep) state. Since the voltage of the capacitor cannot be abruptly changed, the gate-source voltage of the field effect transistor Q10 is about the voltage of the battery in the battery pack. The field effect transistor Q10 is turned on. The on-resistance between the negative terminal (ground terminal) P− of the battery pack and the negative electrode B− of the battery is about 100 ohms (R40), such that the voltage between the negative terminal (ground terminal) P− of the battery pack and the negative electrode B− of the battery is pulled down, thereby increasing the voltage difference between the VM terminal and the VDD terminal. When the protection unit 210 internally detects that the voltage difference between the VM terminal and the VDD terminal is greater than 13 V, and that the voltage difference between the VDD terminal and the VSS terminal is greater than the undervoltage release voltage, the protection unit 210 is activated to realize a circuit wake-up function, and the protection circuit 20 changes from the protection (sleep) state to the normal operation state.

The wake-up circuit of the present embodiment has a simple structure, relatively few components are used, and accordingly, the cost of the wake-up circuit of the present disclosure can be reduced.

Referring to FIG. 4, a schematic diagram of the wake-up circuit in another embodiment is provided. The wake-up circuit 30 may further include a field effect transistor Q1, a resistor R33, a resistor R34, a resistor R35, and a capacitor C13. One end of the resistor R35 is connected to a negative electrode B− of a battery, and the other end of the resistor R35 is connected to a first switching device 310. The other end of the first switching device 310 is connected to a source of the field effect transistor Q1. A gate of the field effect transistor Q1 is connected to the capacitor C13. A drain of the field effect transistor Q1 is grounded. The other end of the capacitor C13 is connected to a positive electrode B+ of the battery. The resistor R34 is connected between the gate and the source of the field effect transistor Q1. The resistor R33 is connected between the source and the drain of the field effect transistor Q1. The common terminal of the resistor R33 and the drain of the field effect transistor Q10 is connected between the ground terminal (negative terminal P− of the battery pack) and the source S2 of the second switching device. It should be understood that the connection relationship between the wake-up circuit 30 and the protection circuit 20 in this embodiment can be referred to the related description of the foregoing embodiment, which will not be described further herein.

The principle of the power supply apparatus wake-up circuit bringing the system into the low pow consumption state is the same as the foregoing embodiment, which will not be described further herein. The principle of waking up the system in the low pow consumption state is similar to the foregoing embodiment of the wake-up circuit. The embodiment also illustrates the operation principle of the wake-up circuit of the present disclosure by taking the components used in the foregoing embodiments as an example:

1: When the first switching device 310 is turned off, the positive terminal P+ of the battery pack or the positive electrode B+ of the battery, the capacitor C13, the resistor R34, the resistor R33 and the ground terminal P− form a charging circuit for the capacitor C13, then, the capacitor C13 is charged via the resistor R34 and the resistor R33.

2: When the first switching device 310 is turned on by pressing operation of the user, there are two cases in the present disclosure due to the connection relationship of the circuits:

a: When the voltage of the negative terminal (ground terminal) P− of the battery PACK and the voltage of the negative electrode B− of the battery are the same, that is, the protection unit 210 in the power consumption control circuit is in an activation state, and gate-source voltage of the field effect transistor Q1 is 0 V, the field effect transistor Q1 is turned off. The on-resistance between the negative terminal (ground terminal) P− of the battery pack and the negative electrode B− of the battery is significantly greater than 100 K (R33+R35), which does not affect the normal protection operation of the protection unit 210.

b: When the voltage of the negative terminal (ground terminal) P− of the battery pack is different from the voltage of the negative electrode B− of the battery, that is, the protection unit 210 in the power consumption control circuit is in a protection (sleep) state. Since the voltage of the capacitor cannot be abruptly changed, the gate-source voltage of the field effect transistor Q1 is about the voltage of the battery in the battery PACK and the field effect transistor Q1 is turned on, such that the on-resistance between the negative terminal (ground terminal) P− of the battery pack and the negative electrode B− of the battery is about 1000 ohms (R35). The voltage between the negative terminal (ground terminal) P− of the battery pack and the negative electrode B− of the battery is accordingly pulled down, thereby increasing the voltage difference between the VM terminal and the VDD terminal. When the protection unit 210 internally detects that the voltage difference between the VM terminal and the VDD terminal is greater than 13 V, and the voltage difference between the VDD terminal and the VSS terminal is greater than the undervoltage release voltage, the protection unit 210 is activated to realize the circuit wake-up function, and the protection circuit 20 changes from the protection (sleep) state to the normal operation state.

It can be seen that the power supply apparatus wake-up circuit of the present disclosure not only retains the original charging wake-up function, but also can realize the wake-up function under various conditions. For example, when the power supply apparatus of the present disclosure is the mobile power supply, correspondingly, the first switching device of the present disclosure can be the key switch to realize a key wake-up function. When the power supply apparatus of the present disclosure is the earphone charging chamber, the first switching device of the present disclosure can be the travel switch or the contact switch. An open-lid wake-up function can be realized with the first switching device in the earphone charging chamber. It is understood that the travel switch or the contact switch shall be provided at a lid of the earphone charging chamber to realize the open-lid wake-up function. The first switch device can also be the contact switch or the magnetic control switch to realize the open-lid wake-up function. It can be understood that in order to realize the open-lid wake-up function, the contact switch or the magnetic control switch should be provided at the position where the charging chamber of the earphone is in contact with the earphone.

Although not shown, the power supply apparatus wake-up circuit of the present disclosure may further include other circuits such as an electrostatic discharge circuit, an LED circuit, a key circuit, a wireless charging circuit, and the like, which will not be described further herein.

The various technical features of the above-described embodiments can be arbitrarily combined. For the sake of brevity of description, all possible combinations of the respective technical features in the above-described embodiments have not been described, however, as long as there is no contradiction in the combination of these technical features, it should be deemed to be the scope of the specification.

The above-described embodiments represent only several embodiments of the disclosure. The description of the embodiments is more specific and detailed, but are not therefore to be construed as limiting the scope of the disclosure patent. It should be noted that several modifications and improvements can be made to those of ordinary skill in the art without departing from the inventive concept, all of the modifications and improvements fall within the scope of the disclosure. Therefore, the scope of protection of the disclosure patent shall be subject to the appended claims.

What is claimed is:

1. A power supply apparatus wake-up circuit, comprising:
   a power consumption control circuit comprising a voltage regulation module and a protection circuit, the voltage regulation module being electrically connected to the protection circuit;
   a wake-up circuit connected to the power consumption control circuit; and
   wherein the voltage regulation module adjusts a voltage output to the protection circuit according to a sleep control signal;
   wherein the protection circuit determines whether to trigger over-discharge protection according to the input voltage; and
   wherein the wake-up circuit comprises a first switching device, and the wake-up circuit outputs a wake-up control signal to the protection circuit based on an operation of the first switching device by a user such that the protection circuit stops the triggering of the over-discharge protection.

2. The power supply apparatus wake-up circuit of claim 1, wherein the power consumption control circuit further comprises a control circuit connected to the voltage regulation module and configured to output the sleep control signal.

3. The power supply apparatus wake-up circuit of claim 2, wherein the voltage regulation module is a voltage dividing resistor.

4. The power supply apparatus wake-up circuit of claim 2, wherein the voltage regulation module is a PWM voltage regulation circuit adjusting a duty ratio of an output PWM signal according to the sleep control signal.

5. The power supply apparatus wake-up circuit of claim 2, wherein the voltage regulation module is a digital-analog control circuit configured to output, according to the sleep control signal, a preset voltage to the protection circuit to cause the protection circuit to trigger the over-discharge protection.

6. The power supply apparatus wake-up circuit of claim 2, wherein the protection circuit comprises:
   a protection unit an input terminal of which being connected to an output terminal of the voltage regulation module;
   a second switching device an input terminal of which being connected to an output terminal of the protection unit;
   wherein the protection unit controls the second switching device to cut off system power supply of the power supply apparatus wake-up circuit in response to that a voltage output by the voltage regulation module is lower than a voltage threshold.

7. The power supply apparatus wake-up circuit of claim 6, wherein the protection unit adopts a type S-8211 lithium battery protection chip.

8. The power supply apparatus wake-up circuit of claim 6, wherein the second switching device is a field effect transistor.

9. The power supply apparatus wake-up circuit of claim 1, wherein the first switching device comprises any one of a key switch, a travel switch, a contact switch, or a magnetic control switch.

10. The power supply apparatus wake-up circuit of claim 9, wherein the wake-up circuit further comprises a field effect transistor Q1, a resistor R33, a resistor R34, a resistor R35, and a capacitor C13, one end of the resistor R35 being connected to a negative electrode of a battery, and the other end of the resistor R35 being connected to the first switching device, the other end of the first switching device being connected to a source of the field effect transistor Q1, a gate of the field effect transistor Q1 being connected to the capacitor C13, and a drain of the field effect transistor Q1 being grounded, the other end of the capacitor C13 being connected to a positive electrode of the battery, the resistor R34 being connected between the gate and the source of the field effect transistor Q1, the resistor R33 being connected between the source and the drain of the field effect transistor Q1.

11. The power supply apparatus wake-up circuit of claim 9, wherein the wake-up circuit further comprises a field effect transistor Q10, a resistor R38, a resistor R40, and a capacitor C37, one end of the resistor R40 being connected to the negative electrode of the battery, and the other end of the resistor R40 being connected to the first switching device, the other end of the first switching device being connected to a source of the field effect transistor Q10, a gate of the field effect transistor Q10 being connected to the capacitor C37, and a drain of the field effect transistor Q10 being grounded, the other end of the capacitor C37 being connected to the positive electrode of the battery, the resistor R38 being connected between the gate and the drain of the field effect transistor Q10.

\* \* \* \* \*